Dec. 1, 1931.  W. R. HUME  1,834,244
MANUFACTURE OF SHEET METAL PIPES AND THE LIKE
Original Filed June 6, 1928
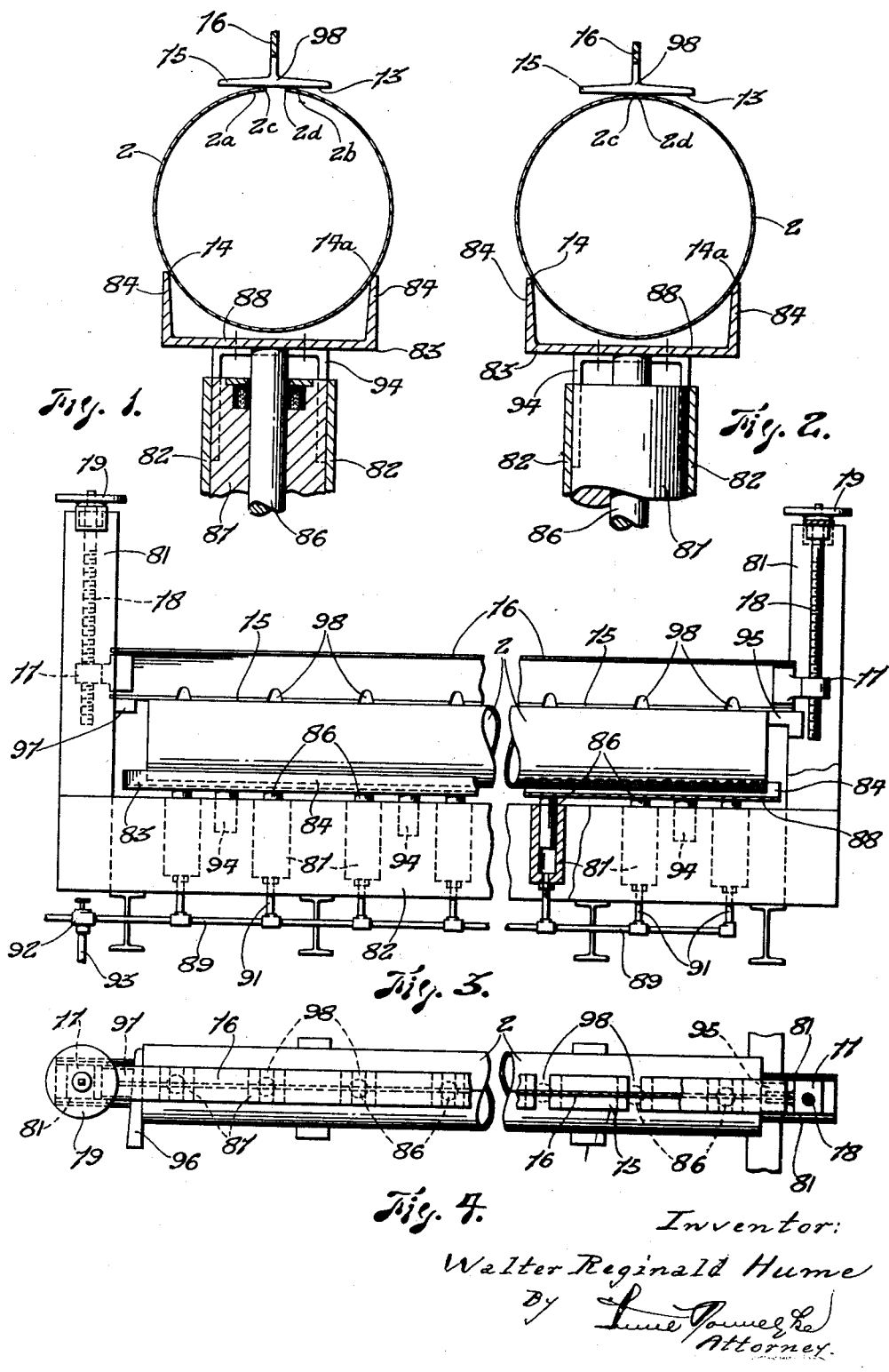

Patented Dec. 1, 1931

1,834,244

UNITED STATES PATENT OFFICE

WALTER REGINALD HUME, OF MELBOURNE, VICTORIA, AUSTRALIA

MANUFACTURE OF SHEET METAL PIPES AND THE LIKE

Original application filed June 6, 1928, Serial No. 283,356, now Patent No. 1,816,534, dated July 28, 1931, and in Australia June 27, 1927. Divided and this application filed September 7, 1929. Serial No. 391,003.

This invention relates to the manufacture of pipes and like hollow or tubular articles from metal sheets or plates which are first rolled or shaped in a bending machine or the like so as to form curved blanks the meeting edges of which are subsequently secured together, for instance by welding, to thereby form the pipe or like article.

The object of the present invention is to facilitate manufacture and ensure the production of true form pipes or like articles by the provision of a method and means for bringing the longitudinal meeting edges of the curved blanks into closely abutted relationship and retaining them in position while they are temporarily or permanently united.

In the preferred form of the invention the longitudinal edges of a blank while held in abutted relationship are first temporarily united by tack welding at longitudinal intervals, after which a permanent and continuous joint is formed by welding the edges together from end to end of the curved blank.

Referring to the drawings which form part of this specification:—

Figure 1 is a cross sectional view of means in accordance with this invention for bringing the longitudinal edges of a curved blank into closely abutted relationship preparatory to uniting same.

Figure 2 is a view similar to Figure 1 but in which the longitudinal edges are closely abutted.

Figure 3 is a contracted side elevation of apparatus for closing the meeting edges of a curved blank, and embodies the means illustrated in Figures 1 and 2.

Figure 4 is a plan of Figure 3.

The pipe blanks 2 may be shaped into substantially cylindrical form by any suitable means and if the meeting edge portions 2a, 2b, happen to be slightly flattened by such shaping they may be correctly curved before the blanks are acted upon in accordance with the present invention. A suitable method and means for eliminating such flatness from the meeting edge portions is disclosed in the specification of my co-pending United States patent application Serial No. 283,356, filed June 6, 1928, now Patent No. 1,816,534, dated July 28, 1931, from which the present application has been divided. It is to be understood, however, that such initial treatment of the meeting edge portions 2a, 2b, may not be necessary and in any case forms no part of the present invention.

According to this invention in order to bring the meeting edges 2c, 2d, of a curved pipe blank into closely abutted relationship, the meeting edge portions 2a, 2b, are adapted to bear against a stop face, or abutment 73 (as indicated in Figures 1 and 2) while pressure, acting towards said stop face, is applied simultaneously to the external surface of the blank at two zones or points 74, 74a, (Figures 1 and 2) which, in endwise viewing of the blank, are preferably spaced equi-distant from the gap between said meeting edges, 2c, 2d, and from each other. By thus applying pressure to the blank the meeting edge portions 2a, 2b, are caused to slide inwardly so that the meeting edges 2c, 2d, are brought and held against each other, as in Figure 2, without in any way distorting the curvature of the blank which is thus of perfect circular form, in cross section. While the meeting edges are held together as aforesaid they are tack welded at suitably spaced intervals, or otherwise temporarily secured together, so that the cylindrical blank may be removed for final welding along the line of the joint.

The stop face or abutment may be constituted by a horizontal flange 75, of a stop member 76 adapted to extend longitudinally above the blank being treated and to be held stationary during operations. This stop member may have secured thereto at its ends nuts 77 through which extend screws 78 fitted at their upper ends with hand wheels 79 whereby the screws may be operated to raise or lower the nuts and the stop member according to the diameter of the blank to be operated upon. The nuts 77 may be prevented from rotation by being fitted closely within pairs of upstanding plates 81 suitably supported at each end of a framework 82.

The means for applying pressure to the blank includes a pressure member 83 of substantially channel shape in cross section which is arranged with its side flanges 84 projecting upwards so that the curved blank, with its meeting edge portions 2a, 2b, uppermost, may rest upon the upper edges of said flanges 84.

The presser, which preferably extends longitudinally for the entire length of the blank, may be forced upwardly by a plurality of rams 86 operating in vertical cylinders 87 from the open upper ends of which the rams are projected by fluid pressure. The rams bear at their upper ends against the under surface of the horizontal flange or base 88 of the channel shaped presser 83, and preferably mid-way of the width thereof. The ram cylinders 87 may be suitably attached to the framework 82 at appropriate longitudinally spaced intervals, and fluid under pressure may be led to the cylinders by a main service pipe 89 and a number of branch service pipes 91 (Figure 3). A suitable valve 92 may be provided whereby the fluid may be discharged from said cylinders by way of an exhaust pipe 93.

The presser 83 may have one or more guide members 94 secured to and depending therefrom and adapted to slide within opposite plates of the main framework 82. Presser members 83 of different widths may be employed according to the diameter of the blank to be treated, so that in all cases the blank will be subjected to external pressure at three points or zones spaced approximately equi-distant around the circumference thereof, the pressure applied at two of said points acting in a counter direction to the pressure at the third point or zone which is disposed adjacent the meeting edge portion of the blank.

To ensure that the end edges of the blank are perfectly true, that is to say that they are perfectly square with, or at right angles to, the length of the blank, one end edge of the blank may bear against a stop member 95 (Figures 3 and 4) whilst a wedge 96 may be driven between the other end edge and an inclined face of another stop member 97 as indicated in Figure 4, said stop members being disposed in alignment with the meeting edge portions 2a, 2b, of the blank.

After the presser 83 has been raised to an extent sufficient to cause the meeting edges 2c, 2d, to be abutted, and while the presser remains in such raised attitude the meeting edges are tack welded. To permit access to be had to said meeting edges so that tack welding operations may be carried out, the horizontal flange 75 and, if desired, the adjacent portion of the stop member 76 may have gaps or recesses 98 formed therein at suitably spaced intervals.

Having now described my invention what I claim as new and desire to secure by Letters Patent is:—

1. In apparatus for the manufacture of pipes and like hollow bodies from sheet metal, means for forcing the longitudinal meeting edges of a curved or substantially tubular metal blank into abutted relationship comprising a stop member or abutment adapted to extend longitudinally of and to bear externally against said meeting edge portions of said blank, a presser member adapted to extend longitudinally of the blank and to engage the external surface thereof at points remote from said edges, and means acting on said presser member to force said edge portions of the blank against said stop member or abutment whereby said edges are pressed together in the desired arcuate formation, said stop member or abutment having a working surface which extends substantially tangentially to said meeting edge portions of the blank so that when the latter is subjected to pressure by the presser member said edge portions may slide towards and into abutted relationship with each other against said working surface.

2. In apparatus for the manufacture of pipes and like hollow bodies from sheet metal, means for forcing the longitudinal meeting edges of a curved or substantially tubular metal blank into abutted relationship comprising a stop member or abutment adapted to extend longitudinally of and to bear externally against said meeting edge portions of the blank, a presser member adapted to extend longitudinally of the blank and to engage the external surface thereof at points remote from said edges, means acting on said presser member to force said edge portions of the blank against said stop member or abutment whereby said edges are pressed together in the desired arcuate formation, said stop member or abutment having a working surface which extends substantially tangentially to said meeting edge portions of the blank so that when the latter is subjected to pressure by the presser member said edge portions may slide towards and into abutted relationship with each other against said working surface, said stop mmeber being provided with recesses at longitudinally spaced intervals whereby the abutted edges of the blank may be initially united within said recesses.

3. In apparatus for the manufacture of pipes and like hollow bodies from sheet metal, means for forcing the longitudinal meeting edges of a substantially tubular metal blank into abutted relationship, comprising a stop member or abutment adapted to extend longitudinally of and to bear externally against said meeting edge portions of the blank, a presser member adapted to extend longitudinally of the blank and to engage the external surface thereof at two positions in its circumference, said points being spaced approximately equi-distant from the longitudinal meeting edges of the blank, and means acting on said presser member to force said edge portions of the blank against said stop member or abutment whereby said edges are pressed together in the desired arcuate formation.

4. In apparatus for the manufacture of pipes and like hollow bodies from sheet metal, means for forcing the londitudinal meeting edges of a curved or substantially tubular metal blank into abutted relationship comprising a stop member or abutment adapted to extend longitudinally of the blank and having a working surface disposed tangentially to and adapted to bear externally against said meeting edge portions of the blank, a presser member adapted to extend longitudinally of the blank, said presser member being of channel shape in cross section the outer ends of the opposite side flanges thereof being adapted to engage the substantially tubular blank at two positions in its circumference said points being spaced approximately equi-distant from said meeting edges of the blank, and means acting on said presser member to force said edge portions of the blank against said stop member or abutment whereby said edge portions are caused to slide towards and into abutted relationship with each other against said working face of the abutment.

5. In apparatus for the manufacture of pipes and like hollow bodies from sheet metal, means for forcing the longitudinal meeting edges of a curved or substantially tubular metal blank into abutted relationship comprising a stop member or abutment adapted to extend longitudinally of and to bear externally against said meeting edge portions of the blank, a presser member adapted to extend longitudinally of the blank, and to engage the external surfaces thereof at positions in its circumference remote from said edges, and a series of rams acting on said presser member to force said edge portions of the blank against said stop member or abutment whereby said edges are pressed together in the desired arcuate formation.

6. In apparatus for the manufacture of pipes and like hollow bodies from sheet metal, means for forcing the longitudinal meeting edges of a curved or substantially tubular metal blank into abutted relationship comprising a stop member or abutment adapted to extend longitudinally of and to bear externally against said meeting edge portions of the blank, a presser member adapted to extend longitudinally of the blank and to engage the external surface thereof at different positions in its circumference, means acting on said presser member to force said edge portions of the blank against said stop member or abutment whereby said edges are pressed together in the desired arcuate formation, and a series of rams operating within cylinders each having means of communication with a common supply of fluid under pressure, said rams being arranged at longitudinally spaced intervals in relation to said presser member and adapted to operate the latter.

7. In apparatus for the manufacture of pipes and like hollow bodies from sheet metal, means for forcing the longitudinal meeting edges of a substantially tubular metal blank into abutted relationship comprising a stop member or abutment adapted to extend longitudinally of and to bear externally against said meeting edge portions of the blank, a presser member adapted to extend longitudinally of the blank and to engage the external surface thereof at a point remote from said edges, means acting on said presser member to force said edge portions of the blank against said stop member or abutment whereby said edges are pressed together in the desired arcuate formation, said stop member or abutment having a working surface which extends substantially tangentially to said meeting edge portions of the blank so that when the latter is subjected to pressure by the presser member said edge portions may slide towards and into abutted relationship with each other against said working surface, said stop member being provided with recesses at longitudinally spaced intervals whereby the abutted edges of the blank may be initially united within said recesses.

In testimony whereof I affix my signature.

W. R. HUME.